Nov. 12, 1957   W. NICHOLAS   2,812,808
PROJECTION SCREEN
Filed March 26, 1954   4 Sheets-Sheet 2
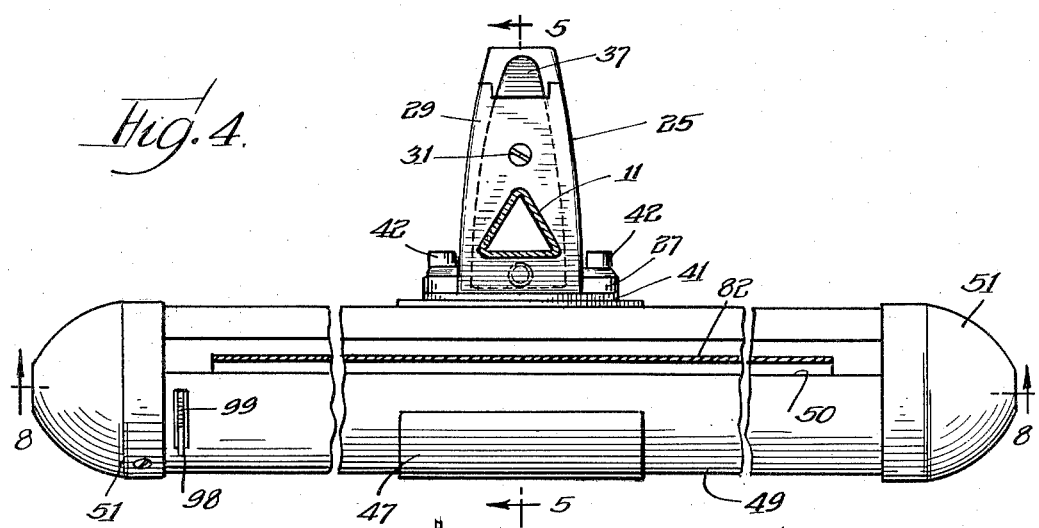
Fig. 4.
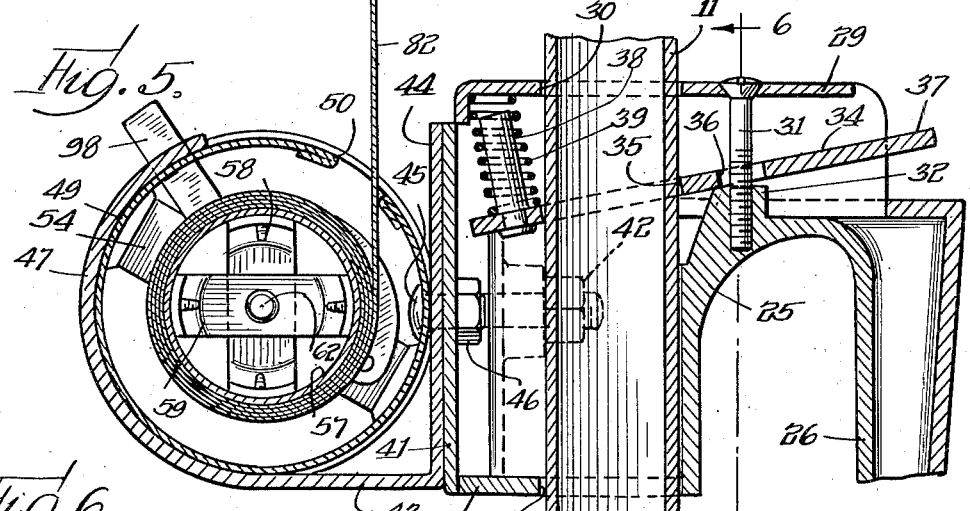
Fig. 5.
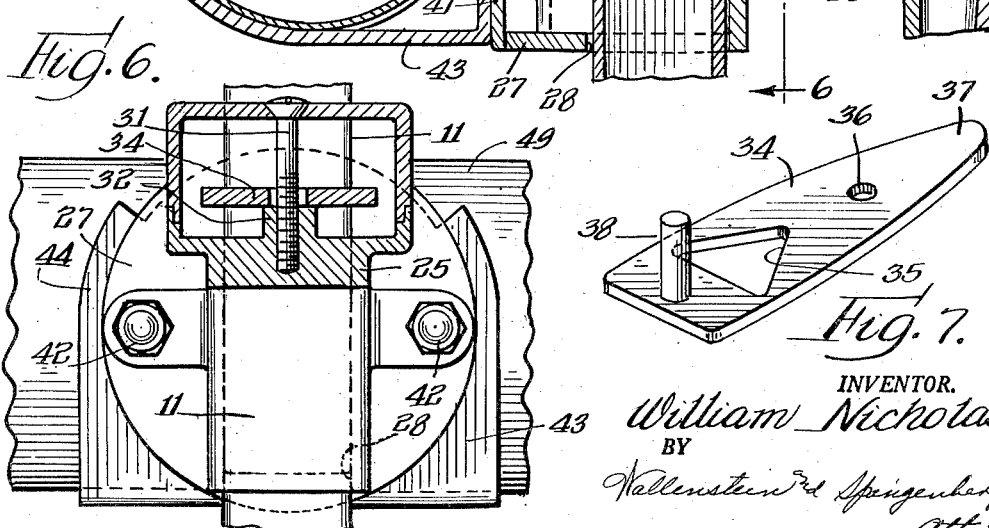
Fig. 6.
Fig. 7.
INVENTOR.
William Nicholas
BY
Wallenstein and Spangenberg
Attys.

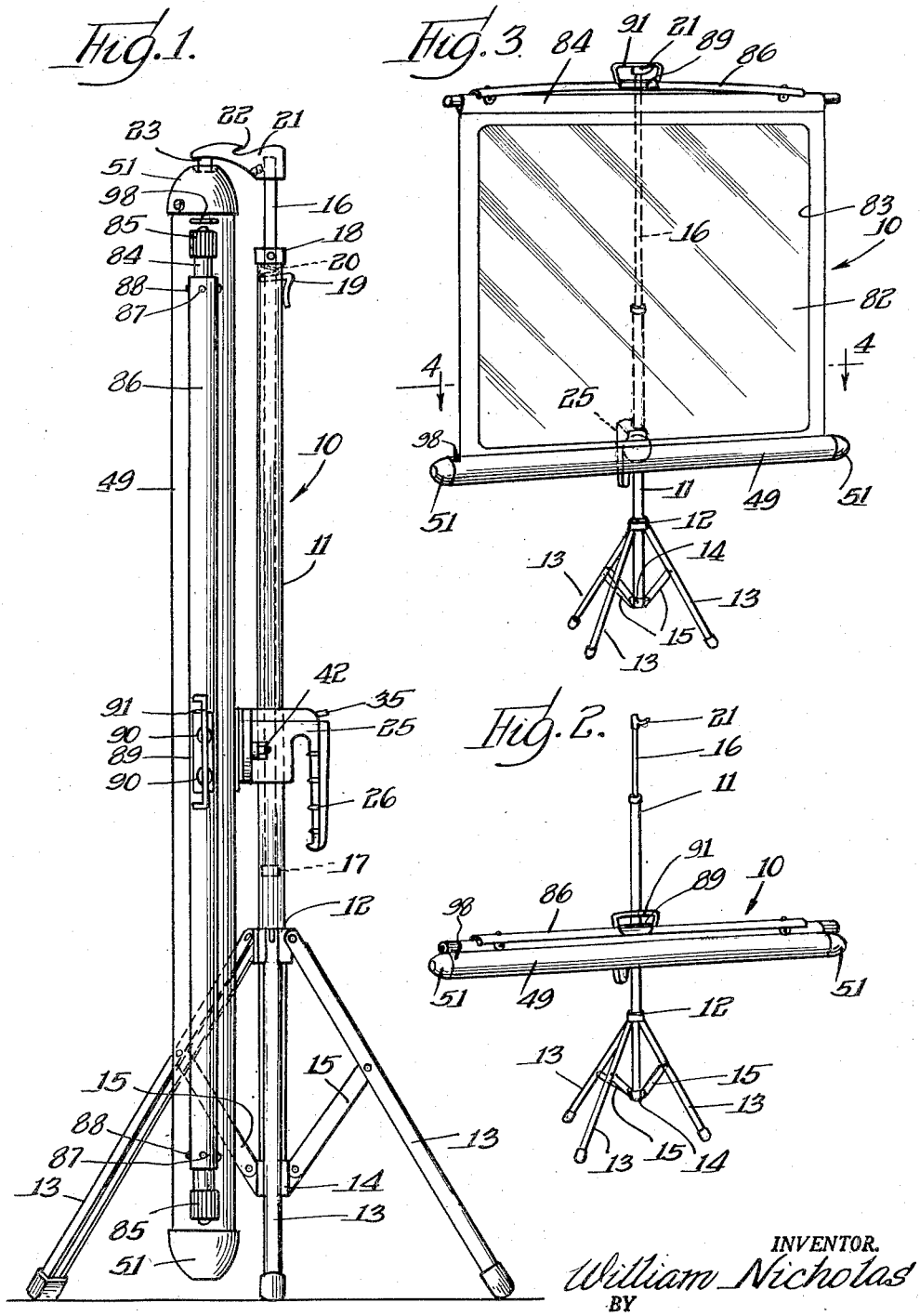

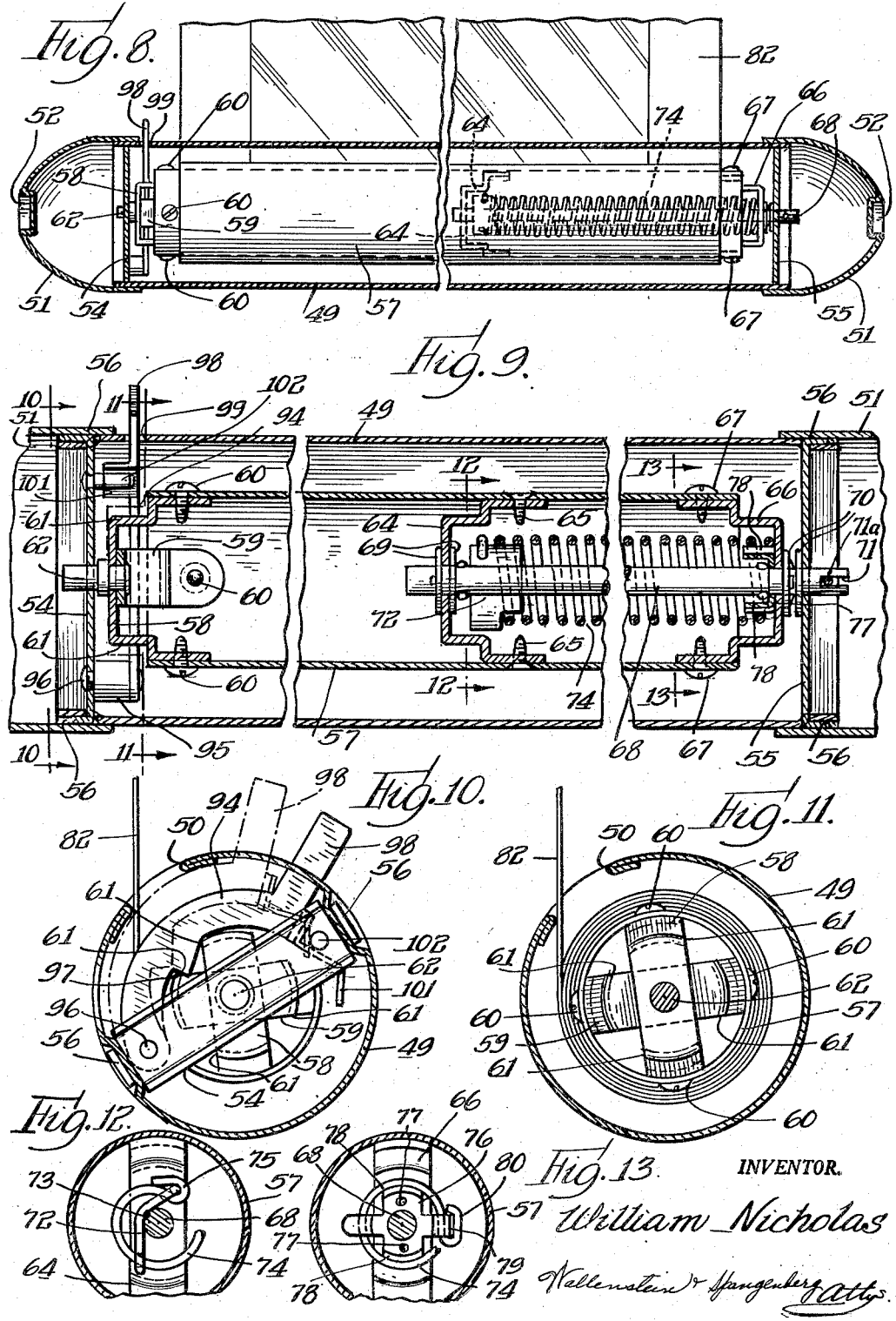

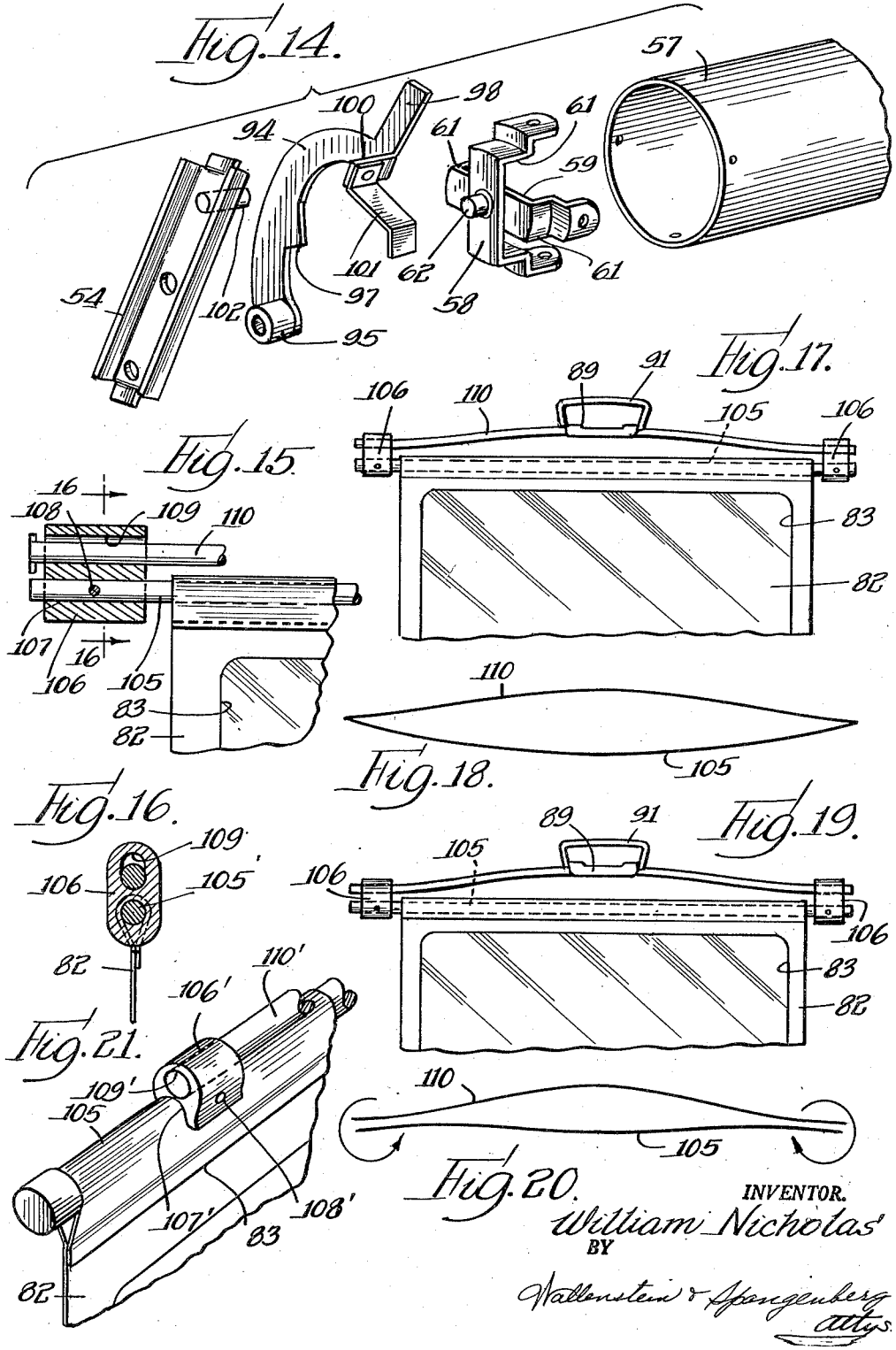

United States Patent Office 2,812,808
Patented Nov. 12, 1957

2,812,808

PROJECTION SCREEN

William Nicholas, Evanston, Ill., assignor to Radiant Manufacturing Corporation, Chicago, Ill., a corporation of Illinois Application March 26, 1954, Serial No. 418,946

13 Claims. (Cl. 160—24)

This invention relates to projection screens for use in exhibiting pictures projected thereon.

The principal object of this invention is to provide an improved projection screen which is particularly adaptable for use in exhibiting three dimensional pictures and wherein a flexible screen carried by a roller may be unrolled and tensioned in a new and improved manner so as to provide a substantially flat exhibiting surface for the projected three dimensional pictures.

Briefly, the projection screen comprises a supporting stand including a post, a handle member slidably mounted on the post, a screen case carried by the handle member, a spring actuated roller mounted in the screen case, a flexible screen secured at one end to the roller and adapted to be automatically rolled thereon and having a suspension slat at its other end, and a hook member slidably carried by the post and spaced from the handle member. This structure thus far described is conventional and may be of any desired type. For example, the stand may be a collapsible stand having collapsible legs and having means for pivoting the screen case with respect to the stand.

In accordance with this invention such a projection screen is provided with manually controlled means operatively connected between the hook member and the post for releasably locking the hook member at any desired position along the post against movement toward the handle member, and also manually controlled means operatively connected between the handle member and the post for releasably locking the handle member at any desired position along the post against movement toward the hook member. Means including resilient means are provided for releasably securing the suspension slat to the hook member in picture exhibiting position when the screen is unrolled from the roller. Manually controlled means are also operatively connected between the screen case and the roller for releasably locking the roller against rotation in the unrolling direction. In this arrangement, when the screen is located in picture exhibiting position and the handle and hook members are moved apart and locked while the roller is locked, the resilient means is tensioned to tension the screen in picture exhibiting position so that it forms a substantially flat exhibiting surface for the projected three dimensional pictures.

Further objects of this invention reside in the details of construction of the manually controlled locking means for the handle member, the manually controlled locking means for the roller, the roller itself and the resilient means for supporting the suspension slat, and in the cooperative relationship between the same.

Other objects and advantages of this invention will become apparent to those skilled in the art upon reference to the accompanying specification, claims and drawings in which:

Fig. 1 is a side elevational view of the projection screen of this invention with the legs of the supporting stand extended and with the screen case vertically arranged;

Fig. 2 is a perspective view of the projection screen with the screen case horizontally located and with the screen contained within the screen case;

Fig. 3 is a view similar to Fig. 2 but illustrating the screen in picture exhibiting position;

Fig. 4 is a horizontal sectional view taken substantially along the line 4—4 of Fig. 3;

Fig. 5 is a vertical sectional view taken susbtantially along the line 5—5 of Fig. 4;

Fig. 6 is a vertical sectional view taken substantially along the line 6—6 of Fig. 5;

Fig. 7 is a perspective view of the nipping lever located in the handle member as illustrated in Fig. 5;

Fig. 8 is a vertical sectional view taken substantially along the line 8—8 of Fig. 4;

Fig. 9 is an enlarged vertical sectional view similar to Fig. 8;

Fig. 10 is a vertical sectional view taken substantially along the line 10—10 of Fig. 9;

Fig. 11 is a vertical sectional view taken substantially along the line 11—11 of Fig. 9;

Fig. 12 is a vertical sectional view taken substantially along the line 12—12 of Fig. 9;

Fig. 13 is a vertical sectional view taken substantially along the line 13—13 of Fig. 9;

Fig. 14 is an exploded perspective view illustrating the manual controlled locking means for the roller;

Fig. 15 is a view partly in section illustrating one manner of supporting the suspension slat;

Fig. 16 is a vertical sectional view taken substantially along the line 16—16 of Fig. 15;

Figs. 17 and 19 illustrate the form of the resilient supporting means for the suspension slat including the mechanism illustrated in Figs. 15 and 16;

Figs. 18 and 20 are diagrams illustrating the manner of operation of the resilient means of Figs. 17 and 19;

Fig. 21 is a perspective view of another form of resilient means for supporting the suspension slat.

Referring first to Figs. 1 to 3, the projection screen of this invention is generally designated at 10. It includes an upright tube 11 which is generally triangular in cross-section. A bracket 12 is slidably carried on the upright tube 11 and a plurality of legs 13 are pivotally secured to the bracket 12. Fixed to the bottom of the upright tube or post 11 is a bracket 14 and links 15 are pivotally secured to this bracket 14 and to the legs 13. The legs 13 may be folded together for transportation purposes and when this is done, the bracket 12 slides upwardly on the upright tube or post 11. Suitable latch means (not shown) are preferably provided for holding the legs 13 in collapsed position. When the legs 13 are extended for exhibiting purposes as illustrated in Figs. 1 to 3 the bracket 12 slides downwardly on the upright post 11. In this way, the supporting stand is maintained in an upright position.

An extension rod 16 is slidably mounted in the upright tube or post 11, the extension rod being guided for vertical movement by a collar 17 carried on the lower end of the exision rod and a cap 18 carried on the upper end of the post 11. The extension rod 16 is maintained in any desired extended position by a nipping lever 19 extending through a suitable opening in the upright tube or post 11 and gripping the extension rod 16. The nipping lever is resiliently urged into gripping position by means of a spring 20 and the action of this spring may be overcome by manually manipulating the nipping lever 19 to allow desired adjustment of the position of the extension rod 16. The upper end of the extension rod 16 carries a bracket 21 having a hook portion 22 and a nob 23. There is thus provided a hook member which is slidably and adjustably carried by the post.

A hollow handle member 25 having a handle portion 26 and a circular portion 27 is slidably carried on the upright tube or post 11. In this connection, it is provided with an opening 28 for receiving the post 11. The handle member 25 is also provided with a cover 29 which is provided with an opening 30 for receiving the post 11. The cover 29 is secured to the handle member 25 by a screw 31 screw threaded into a boss 32 having a shoulder.

Located within the hollow handle member 25 is a nipping lever in the form of a plate 34 having an opening 35 conforming to and receiving the post 11. The plate 34 also has a hole 36 for accommodating the screw 31 and is provided at one end with an extension 37 forming a manipulating finger which extends outwardly from the hollow handle member 25. The other end of the plate 34 is provided with a spring seat 38 in the form of a post. The plate 34 is fulcrumed on one side on the shoulder 32 of the hollow handle member 25. Around the post 38 and extending between the cover 29 and the other side of the plate 34 is a compression spring 39. This compression spring 39 operates to tilt the plate 34 about the fulcrum 32 to cause the edges of the opening 35 in the plate 34 to engage and grip the opposite sides of the post 11. In this position, the nipping lever forcibly engages the post 11 and prevents relative motion therebetween in either direction. Movement of the handle member 25 upwardly with respect to the post 11 is prevented by the shoulder 32 engaging the nipping lever 34. It is noted that the post 38 extends in close proximity to the cover 29 and the post 38 and the cover 29 operate as a stop means. When the handle member 25 is pushed downwardly the post 38 engages the cover member 29 and prevents further downward movement of the handle member 25. Thus with the nipping lever 34 in the position shown in Fig. 5 upward and downward movement of the handle member 25 with respect to the post 11 is prevented. In other words, the handle member 25 is releasably locked to the post 11 against movement in either direction. When, however, the extension finger 37 of the nipping lever 34 is pressed downwardly the nipping lever is fulcrumed about the shoulder 32 to release the edges of the opening 35 from the post 11. When this is done, the handle member 25 may be freely moved upwardly and downwardly along the post 11 to any desired position. When the nipping lever 34 is released it automatically grips the post 11 and locks the handle member 25 in the adjusted position on the post 11.

A circular plate 41 is secured to the circular portion 27 of the handle member 25 by bolts and nuts 42. A bracket 43 having a flat leg 44 is pivotally mounted on the plate 41 by means of a bolt 45 and nut 46. The bracket 43 is also provided with a curved leg 47 to which is secured, as by spot welding, a screen case 49 having a slot 50 therein. The bolt 45 in addition to extending through the bracket leg 44 also extends through the screen case 49 as illustrated in Fig. 5. A pair of closure caps 51 are removably secured to the ends of the cylindrical screen case 49 and these caps are provided with recesses 52 which are adapted to receive the button 23 of the hook member when the screen case is arranged in vertical position as illustrated in Fig. 1. As shown in Figs. 2 and 3, the screen case 49 may be swung from its vertical position to horizontal position, this being afforded by the pivotal connection between the screen case and the handle member 25.

Located at each end of the screen case 49 are supporting members 54 and 55. These supporting members are preferably channel shaped and are provided with ears 56 which are received in slots in the ends of the screen case. These supporting members 54 and 55 are utilized for supporting a roller within the screen case. The roller includes a substantially rigid one piece metal tube 57 so that it will not bend appreciably upon tensioning of the screen. A pair of brackets 58 and 59 are secured by means of screws 60 to one end of the roller 57, these brackets forming a mounting spider for the roller. The brackets 58 and 59 are off-set to provide a plurality of latching surfaces 61. The spider formed by the brackets 58 and 59 is provided with a spin 62 which is rotatably mounted in a suitable hole in the supporting member 54. In this way, one end of the roller 57 is mounted for rotation in the screen case 49.

A bracket 64 may be mounted intermediate its end in the roller 57 by means of screws 65. In a like manner a bracket 66 is secured to the other end of the roller 57 by screws 67. The brackets 64 and 66, forming spiders, are provided with holes for receiving a shaft 68 which shaft extends through a suitable hole in the supporting member 55 for supporting the other end of the roller 57. Here the end of the shaft 68 is provided with a slot 71 for the reception of a screw driver or similar tool for rotating the shaft to wind a spring 74 about the shaft to the desired extent. Thereafter, a pin 71a is inserted through holes in the flanges of the support 55 and the slot 71 to prevent rotation of the shaft. A pair of washers 69 are located on each side of the bracket 64 and a pair of washers 70 are interposed between the bracket 66 and the supporting member 55. The shaft 68 is suitably upset or peened adjacent the brackets 64 and 66 to prevent longitudinal movement of the shaft 68 with respect to the brackets 64 and 66.

A clip 72 is secured to the shaft 68 adjacent the bracket 64 as by welding indicated at 73. This clip 72 is provided with a pair of holes for receiving one end of a coil spring 74, the end of the coil 74 being bent over as indicated at 75 for securing that end of the coil spring to the clip 72. A clip 76 is secured to the bracket 66 as by welding indicated at 77. This clip 76 is provided with a pair of arms 78 for centering the other end of the coil spring 74. That end of the coil spring 74 is bent over an ear 79 on the clip 76 as indicated at 80 for the purpose of securing that end of the spring to the clip. Since one end of the spring 74 is secured to the stationary shaft 68 and the other end is secured to the roller 57 through the bracket 66, the spring when wound operates to rotate the roller 57 in one direction and yet permits rotation of the roller in the opposite direction.

One end of a flexible screen 82 is suitably secured to the roller 57 by means of an adhesive or the like. The flexible projection screen 82 may be made out of any suitable material such as a suitable treated cloth and it may be provided with a suitable picture projection surface such as a reflective silvered surface 83. The other end of the flexible screen 82 is secured over a suspension slat 84 which may take the form of a rod or tube. The ends of the suspension slat 84 may be provided with suitable knobs 85. The ends of a leaf spring member 86 are secured as by rivets 87 to a pair of clips which are in turn secured by rivets 88 to the suspension slat 84. The leaf spring member 86 may be in the form of a substantial semi-circle in cross-section. A bracket 89 is secured to the spring member 86 by rivets 90 and the bracket 89 carries a bale 91. The bale 91 is utilized for unrolling the flexible screen from the roller out through the slot 50 in the screen case and is also utilized for holding the screen in picture projecting position by engaging over the hook member 21. By reason of this construction there is provided a resilient means for securing the suspension slat 84 to the hook member 21 for supporting the projection screen in picture exhibiting position.

A lever 94 having a boss 95 is pivoted by a pivot pin 96 to the supporting member 54. This lever 94 is provided with a latch shoulder 97 which is adapted to engage one or the other of the latch surfaces 61 on the spider formed by the brackets 58 and 59. The lever 94 is provided with an extension finger 98 extending outwardly through a slot 99 in the screen case 49 so that the lever may be manually moved from one position to another position as illustrated in Fig. 10. The lever 94 is also provided with an ear 100 to which is secured a cam spring 101. This cam spring 101 cooperates with a pin 102 carried by the supporting member 54 for resiliently clamping or maintaining the lever 94 in a locking position as illustrated in solid lines in Fig. 10 or in a free position as illustrated by dotted lines in Fig. 10. When the lever 98 is moved to the locking position the latch shoulder 97 engages one of the latch surfaces 61 and prevents rotation of the roller 57 in an unrolling direction. When the lever is moved to the free position the roller 57 may be freely rotated since the latch shoulder 61 is then moved out of the path of movement of the latch surfaces 61.

When the projection screen of this invention is to be utilized for exhibiting pictures the hook member 21 is moved to the desired position and clamped in that position by the nipping lever 19. The screen is then withdrawn from the screen case 49 and the bale 91 is hooked over the hook member 21 so that the screen 82 assumes the position as shown in Fig. 3. The lever 94 is moved to locking position to lock the roller 57 and prevent further unrolling of the screen 82. The nipping lever 34 in the handle member 25 is then manipulated and the handle member 25 is pushed downwardly along the post 11. In so doing, the resilient means 86 is tensioned for the purpose of applying tension to the flexible screen 82 and after the desired amount of tension is applied the nipping lever 34 is released and the handle member 25 is thereupon automatically locked in the position to maintain the desired tension on the projection screen. By so tensioning the screen 82 it is maintained in a substantially flat condition which makes its particularly adaptable for exhibiting projected three dimensional pictures. Since the roller 57 is a substantially rigid metal roller it will not bend or bulge upon tensioning of the screen and this effectively eliminates wrinkles and so forth in the screen. When it is desired to lower the screen 82, the preferred method is to first release the tension at the case handle 25, remove the bail 91 from the extension hook 21 and retract the screen into the case. The locking lever 98 will rachet until the screen is completely within the case and will lock the screen into the case and prevent accidental "spilling" of the screen out of the case. It is not necessary to release the locking lever 98 to retract screen. Another method is to retract the extension rod and follow the same method as above. The locking lever is so constructed that it may be placed into unlock or free position while the screen is tensioned, but this is not recommended and is only supplied as a safety feature against accidental release. Since both the hook member 21 and the handle member 25 are adjustable in both directions with respect to the post 11 the position of the projection screen with respect to the supporting stand may be adjusted at will.

Referring now to Figs. 15 to 20 there is illustrated another form of resilient means for supporting the suspension slat of the flexible screen 82. Here the suspension slat is formed from a metal tube 105 which has a bracket 106 secured to each end thereof. Each bracket 106 is provided with a hole 107 receiving the end of the suspension slat or tube 105, the bracket 106 being secured to the suspension slat 105 by means of a rivet 108 or the like. Each bracket 106 is also provided with a hole 109 which is generally parallel to the suspension slat 105. A leaf spring member 110 in the form of a metal tube is received in the holes 109 of the brackets 106 and as noted in Figs. 15 and 16 there is a predetermined clearance between the hole 109 and the rod 110. The rod 110 is centrally provided with a bracket 89 having a bale 91 to be hooked over the hook member 21. When the screen 82 is placed in exhibiting position and tension is applied to the screen in the manner described above, the suspension slat 105 and the spring member 110 first resiliently bow apart as shown in exaggerated form in Fig. 18. This bowing apart continues until the clearance between the member 110 and the holes 109 is taken up. As the application of tension to the screen continues, the brackets 106 apply a twisting torque to the ends of the suspension slat 105 to produce a reverse bow in the suspension slat 105 as illustrated in an exaggerated manner in Fig. 20. The imparting of this reverse bow to the suspension slat 105 operates substantially to straighten the same. Thus the upper end of the screen 82 is supported in substantially a straight line which eliminates wrinkling of the screen in tension which might occur if the suspension slat 105 were allowed to bow considerably.

A further form of the resilient supporting means for the suspension slat is illustrated in Fig. 21. This form of the invention is like that illustrated in Figs. 15 to 20 and like reference characters primed have been utilized for like parts. The essential difference resides in the location of the brackets 106′. Here the brackets 106′ are located inwardly somewhat from the ends of the suspension rod or slat 105. Here the hole 107′ for receiving the suspension slat 105 is open at its bottom and is held in place on the suspension slat 105 by rivets 108′. The manner of operation of the arrangement of Fig. 21 is like that described above in connection with Figs. 15 to 20.

While for purposes of illustration one basic form of this invention has been disclosed other forms thereof may become apparent to those skilled in the art upon reference to this disclosure and therefore this invention is to be limited only by the scope of the appended claims.

I claim as my invention:

1. In a projection screen for use in exhibiting pictures and having a supporting stand including a post, a handle member slidably mounted on the post, a screen case carried by the handle member, a spring actuated roller mounted in the screen case, a flexible screen secured at one end to the roller and being automatically rollable thereon and having a suspension slat at its other end, and a hook member slidably carried by the post and spaced from the handle member, in combination therewith, manually controlled means operatively connected between the hook member and the post for releasably locking the hook member at any desired position along the post against movement toward the handle member, manually controlled means operatively connected between the handle member and the post for releasably locking the handle member at any desired position along the post against movement toward the hook member, means for releasably securing the suspension slat to the hook member in picture exhibiting position when the screen is unrolled from the roller and including resilient means connected to the suspension slat for applying a greater tension to the screen than can be applied by the spring actuated roller, and manually controlled means operatively connected between the screen case and the roller for only releasably locking the roller against rotation in the unrolling direction so that when the screen is located in picture exhibiting position and the handle and hook members are moved apart and locked while the roller is locked, the resilient means is tensioned to tension the screen in picture exhibiting position.

2. In a projection screen for use in exhibiting pictures, a screen case having supporting members at its ends, a substantially rigid one piece tubular metal roller having one end of a screen secured thereto, a first spider member secured to one end of the roller and having a pin rotatably received in one supporting member of the screen case, a second spider member internally secured to the roller intermediate its ends, a third spider member secured to the other end of the roller, a shaft rotatably mounted in the second and third spider members and secured against rotation in the other supporting member of the screen case, a coil spring arranged around the shaft between the second and third spider members, means including a bracket secured to the shaft adjacent the second spider member for securing one end of the coil spring to the shaft, means including a bracket secured to the third spider member for securing the other end of the coil spring to the roller, said spring rotating said roller in a direction to automatically roll the screen thereon and said roller being rotatable in the opposite direction to unroll the screen therefrom to picture exhibiting position, means for applying a tensioning force to the screen in picture exhibiting position, and means for releasably locking the roller against rotation in the unrolling direction to cause tensioning of the screen in picture exhibiting position.

3. In a projection screen for use in exhibiting pictures, a screen case having supporting members at its ends, a substantially rigid one piece tubular metal roller having one end of a screen secured thereto, a first spider member secured to one end of the roller and having a pin rotatably received in one supporting member of the screen case, a second spider member internally secured to the roller intermediate its ends, a third spider member secured to the other end of the roller, a shaft rotatably mounted in the second and third spider members and secured against rotation in the other supporting member of the screen case, a coil spring arranged around the shaft between the second and third spider members, means including a bracket secured to the shaft adjacent the second spider member for securing one end of the coil spring to the shaft, means including a bracket secured to the third spider member for securing the other end of the coil spring to the roller, said spring rotating said roller in a direction to automatically roll the screen thereon and said roller being rotatable in the opposite direction to unroll the screen therefrom to picture exhibiting position, means for applying a tensioning force to the screen in picture exhibiting position, and means for releasably locking the roller against rotation in the unrolling direction to cause tensioning of the screen in picture exhibiting position and including a plurality of latch surfaces on the first spider member circumferentially arranged about the axis of the roller, and a latch member pivoted to the supporting member adjacent the first spider member and movable between a free position and a locking position and having a latch shoulder engaging one of the latch surfaces when in locking position.

4. In a projection screen for use in exhibiting pictures, a screen case having supporting members at its ends, a substantially rigid one piece tubular metal roller having one end of a screen secured thereto, a first spider member secured to one end of the roller and having a pin rotatably received in one supporting member of the screen case, a second spider member internally secured to the roller intermediate its ends, a third spider member secured to the other end of the roller, a shaft rotatably mounted in the second and third spider members and secured against rotation in the other supporting member of the screen case, a coil spring arranged around the shaft between the second and third spider members, means including a bracket secured to the shaft adjacent the second spider member for securing one end of the coil spring to the shaft, means including a bracket secured to the third spider member for securing the other end of the coil spring to the roller, said spring rotating said roller in a direction to automatically roll the screen thereon and said roller being rotatable in the opposite direction to unroll the screen therefrom to picture exhibiting position, means for applying a tensioning force to the screen in picture exhibiting position, and means for releasably locking the roller against rotation in the unrolling direction to cause tensioning of the screen in picture exhibiting position and including a plurality of latch surfaces on the first spider member circumferentially arranged about the axis of the roller, a latch member pivoted to the supporting member adjacent the first spider member and movable between a free position and a locking position and having a latch shoulder engaging one of the latch surfaces when in locking position, a spring cam member carried by the latch member, and a pin carried by the adjacent supporting member and engaged by the spring cam member for releasably retaining the latch member in the free and locking positions respectively.

5. In a projection screen for use in exhibiting pictures and having a supporting stand including a post, a hollow handle member slidably mounted on the post, a screen case carried by the handle member, and means for releasably locking the handle member at any desired position along the post against movement in either direction therealong, the improvement comprising, a shoulder in the handle member on one side of the post, a nipping lever in the handle member comprising a plate normally engaging on one side the shoulder and having an opening conforming to and receiving the post, an extension at one end of the plate forming a manipulating finger and a spring seat on the other end of the plate, a spring interposed between the handle member and the spring seat for tilting the plate about the shoulder in one direction to cause the edges of the opening in the plate to grip opposite sides of the post, the shoulder engaging said one side of the plate to prevent movement of the handle member in one direction when the plate is gripping the post, and stop means between the handle member and said other side of said other end of said plate to prevent movement of the handle member in the other direction when the plate is gripping the post, said plate being tiltable about the shoulder against the action of the spring by manipulating the extension finger of the plate to free the plate from the post to provide for movement of the handle member in either direction.

6. In a projection screen for use in exhibiting pictures and having a supporting stand including a post, a hollow handle member slidably mounted on the post, a screen case carried by the handle member, and means for releasably locking the handle member at any desired position along the post against movement in either direction therealong, the improvement comprising, a shoulder in the handle member on one side of the post, a nipping lever in the handle member comprising a plate normally engaging on one side the shoulder and having an opening conforming to and receiving the post, an extension at one end of the plate forming a manipulating finger and a spring seat on the other side of the plate at the other end thereof, a spring interposed between the handle member and the spring seat for tilting the plate about the shoulder in one direction to cause the edges of the opening in the plate to grip opposite sides of the post, the shoulder engaging said one side of the plate to prevent movement of the handle member in one direction when the plate is gripping the post, said spring seat extending in close proximity to the handle member to form stop means to prevent movement of the handle member in the other direction when the plate is gripping the post, said plate being tiltable about the shoulder against the action of the spring by manipulating the extension finger of the plate to free the plate from the post to provide for movement of the handle member in either direction.

7. In a projection screen for use in exhibiting pictures and having a supporting stand, a hook member carried by the supporting stand, and a flexible screen, in combination therewith, a substantially rigid tubular metal roller secured to one end of the screen upon which the screen is rolled and unrolled, means for mounting the roller on the stand including means for locking the roller against rotation in an unrolling direction, a first metal tube secured to the other end of the screen and forming a suspension slat therefor, a pair of elongated brackets secured to the first metal tube adjacent the ends thereof, each bracket having a hole therein parallel to the first tube, a second metal tube having its ends received in the holes in the brackets, there being a clearance between the second tube and holes, a bail carried by the second tube engaging over the hook member for securing the screen in picture exhibiting position, and means for applying a tensioning force to the screen when the roller is locked, whereby, as tension is applied to the screen, the first and second tubes first resiliently bow apart until the clearance between the bracket holes and the second tube is taken up and then a reverse bow is imparted to the first tube by the brackets to substantially straighten the same to cause the screen to assume a flat condition.

8. In a projection screen for use in exhibiting pictures and having a supporting stand, a hook member carried by the supporting stand, and a flexible screen, in combination therewith, a substantially rigid tubular metal roller secured to one end of the screen upon which the screen is rolled and unrolled, means for mounting the roller on the stand including means for locking the roller against rotation in an unrolling direction, a suspension slat secured to the other end of the screen, an elongated spring member, means including a limited lost motion connection for securing the ends of the elongated spring member to the suspension slat adjacent the ends thereof, a bail carried by the spring member engaging over the hook member for securing the screen in picture exhibiting position, and means for applying a tensioning force to the screen when the roller is locked, whereby, as tension is applied to the screen, the suspension slat and spring member first resiliently bow apart until the lost motion connection is taken up and then a reverse bow is imparted to the suspension slat to substantially straighten the same to cause the screen to assume a flat condition.

9. In a projection screen for use in exhibiting pictures and having a supporting stand including a post, a handle member slidably carried by the post, a screen case carried by the handle member, a spring actuated roller mounted in the screen case, a flexible screen secured at one end to the roller and being automatically rollable thereon and having a suspension slat at its other end, and a hook member slidably carried by the post and spaced from the handle member, in combination therewith, means for releasably securing the suspension slat to the hook member in picture exhibiting position when the screen is unrolled from the roller and including resilient means connected to the suspension slat for applying a greater tensioning force to the screen than can be applied by the spring actuated roller, means operatively connected between the screen case and the roller for only releasably locking the roller against rotation in the unrolling direction when the screen is unrolled to picture exhibiting position, and manually controlled means operatively connected between the post and the handle member and hook member for permitting movement of the handle member and hook member apart and releasably locking them against movement toward each other when the screen is in picture exhibiting position and the roller locked for tensioning the resilient means to tension the screen in picture exhibiting position.

10. In a projection screen for use in exhibiting pictures and having a supporting stand including a post, a handle member slidably carried by the post, a screen case carried by the handle member, a spring actuated roller mounted in the screen case, a flexible screen secured at one end to the roller and being automatically rollable thereon and having a suspension slat at its other end, and a hook member slidably carried by the post and spaced from the handle member, in combination therewith, means for releasably securing the suspension slat to the hook member in picture exhibiting position when the screen is unrolled from the roller and including resilient means connected to the suspension slat for applying a greater tensioning force to the screen than can be applied by the spring actuated roller, means operatively connected between the screen case and the roller for only releasably locking the roller against rotation in the unrolling direction when the screen is unrolled to picture exhibiting position, and including a member having a latch surface and a latch member having a latch shoulder, one of said members being carried by the screen case and the other of said members being carried by the roller, and means for moving the latch member between a free position and a locking position wherein the latch shoulder engages the latch surface, and manually controlled means operatively connected between the post and the handle member and hook member for permitting movement of the handle member and hook member apart and releasably locking them against movement toward each other when the screen is in picture exhibiting position and the roller locked for tensioning the resilient means to tension the screen in picture exhibiting position.

11. In a projection screen for use in exhibiting pictures and having a supporting stand including a post, a handle member slidably carried by the post, a screen case carried by the handle member, a spring actuated roller mounted in the screen case, a flexible screen secured at one end to the roller and being automatically rollable thereon and having a suspension slat at its other end, and a hook member slidably carried by the post and spaced from the handle member, in combination therewith, means for releasably securing the suspension slat to the hook member in picture exhibiting position when the screen is unrolled from the roller and including resilient means connected to the suspension slat for applying a greater tensioning force to the screen than can be applied by the spring actuated roller, means operatively connected between the screen case and the roller for only releasably locking the roller against rotation in the unrolling direction when the screen is unrolled to picture exhibiting position, and including a plurality of latch surfaces carried by the roller and circumferentially arranged about the axis of the roller, and a latch member pivoted to the screen case and manually movable between a free position and a locking position and having a latch shoulder engaging one of the latch surfaces when in locking position, and manually controlled means operatively connected between the post and the handle member and hook member for permitting movement of the handle member and hook member apart and releasably locking them against movement toward each other when the screen is in picture exhibiting position and the roller locked for tensioning the resilient means to tension the screen in picture exhibiting position.

12. In a projection screen for use in exhibiting pictures and having a supporting stand including a post, a handle member slidably carried by the post, a screen case carried by the handle member, a spring actuated roller mounted in the screen case, a flexible screen secured at one end to the roller and being automatically rollable thereon and having a suspension slat at its other end, and a hook member slidably carried by the post and spaced from the handle member, in combination therewith, means for releasably securing the suspension slat to the hook member in picture exhibiting position when the screen is unrolled from the roller and including resilient means connected to the suspension slat for applying a greater tensioning force to the screen than can be applied by the spring actuated roller, means operatively connected between the screen case and the roller for only releasably locking the roller against rotation in the unrolling direction when the screen is unrolled to picture exhibiting position, and including a plurality of latch surfaces carried by the roller and circumferentially arranged about the axis of the roller, and a latch member pivoted to the screen case and manually movable between a free position and a locking position and having a latch shoulder engaging one of the latch surfaces when in locking position, and a spring latch means operatively connected to the screen case and the latch member for releasably retaining the latch member in the free and locking positions, respectively, and manually controlled means operatively connected between the post and the handle member and hook member for permitting movement of the handle member and hook member apart and releasably locking them against movement toward each other when the screen is in picture exhibiting position and the roller locked for tensioning the resilient means to tension the screen in picture exhibiting position.

13. In a projection screen for use in exhibiting pictures and having a supporting stand including a post, a handle member slidably carried by the post, a screen case carried by the handle member, a spring actuated roller mounted in the screen case, a flexible screen secured at one end to the roller and being automatically rollable thereon and having a suspension slat at its other end, and a hook member slidably carried by the post and spaced from the handle member, in combination therewith, means for releasably securing the suspension slat to the hook member in picture exhibiting position when the screen is unrolled from the roller and including resilient means connected to the suspension slat for applying a greater tensioning force to the screen than can be applied by the spring actuated roller, manually controlled means operatively connected between the screen case and the roller for releasably locking the roller against rotation in the unrolling direction when the screen is rolled therein to prevent withdrawal of the screen from the screen case and also for releasably locking the roller against further rotation in the unrolling direction when the screen is unrolled to picture exhibiting position, and manually controlled means operatively connected between the post and the handle member and hook member for permitting movement of the handle member and hook member apart and releasably locking them against movement toward each other when the screen is in picture exhibiting position and the roller locked for tensioning the resilient means to tension the screen in picture exhibiting position.

References Cited in the file of this patent

UNITED STATES PATENTS

| | | |
|---|---|---|
| 819,396 | Angeletti | May 1, 1906 |
| 1,562,105 | McDonald | Nov. 17, 1925 |
| 1,946,639 | Riddell | Feb. 13, 1934 |
| 2,246,995 | Ingersoll | June 24, 1941 |
| 2,417,711 | Smith | Mar. 18, 1947 |
| 2,498,563 | Mallory | Feb. 21, 1950 |
| 2,546,299 | DuMais | Mar. 27, 1951 |
| 2,549,584 | Eller | Apr 17, 1951 |
| 2,696,249 | Prokop et al. | Dec. 7, 1954 |